United States Patent [19]

Brown et al.

[11] Patent Number: 5,529,761
[45] Date of Patent: Jun. 25, 1996

[54] PRODUCTION OF LOW SODA ALUMINA

[75] Inventors: Gregory P. Brown, Budurim; David G. Wood, Minyama Waters, both of Australia

[73] Assignee: Comalco Aluminum Limited, Victoria, Australia

[21] Appl. No.: 284,470

[22] PCT Filed: Feb. 18, 1993

[86] PCT No.: PCT/AU93/00071

§ 371 Date: Oct. 4, 1994

§ 102(e) Date: Oct. 4, 1994

[87] PCT Pub. No.: WO93/16957

PCT Pub. Date: Sep. 2, 1993

[30] Foreign Application Priority Data

Feb. 19, 1992 [AU] Australia .................................. PL0977

[51] Int. Cl.[6] .............................. C01F 7/02; C22B 21/00
[52] U.S. Cl. ........................... 423/121; 423/127; 423/629
[58] Field of Search .................................. 23/305 A, 301; 423/121, 123, 127, 629; 266/168, 170

[56] References Cited

U.S. PATENT DOCUMENTS

| | | | |
|---|---|---|---|
| 3,201,199 | 8/1965 | Lindsay et al. | 23/143 |
| 3,486,850 | 12/1969 | Day | 23/143 |
| 3,649,184 | 3/1972 | Featherston | 23/143 |
| 4,014,985 | 3/1977 | Haleen et al. | 423/629 |
| 4,234,559 | 11/1980 | Tschamper | 423/629 |
| 4,305,913 | 12/1981 | Anjier | 423/123 |
| 4,311,486 | 1/1982 | Yamada et al. | 23/301 |
| 4,364,919 | 12/1982 | Yamada et al. | 423/629 |
| 4,511,542 | 4/1985 | Anjier et al. | 423/121 |
| 4,512,959 | 4/1985 | Pohland et al. | 423/121 |
| 4,614,642 | 9/1986 | Cristol et al. | 423/121 |
| 4,617,179 | 10/1986 | Veyrier | 423/121 |

FOREIGN PATENT DOCUMENTS

| | | |
|---|---|---|
| 91770/82 | 6/1984 | Australia . |
| 34543/84 | 11/1985 | Australia . |
| 50249/85 | 5/1986 | Australia . |
| 2146012 | 9/1984 | United Kingdom . |

OTHER PUBLICATIONS

Brown, Proceedings Light Metals, vol. 119, Feb. 1990 Anaheim, pp. 131–139.
European Search Report dated Aug. 9, 1995.

*Primary Examiner*—Steven Bos
*Attorney, Agent, or Firm*—Nikaido, Marmelstein, Murray & Oram

[57] ABSTRACT

A process is disclosed for the production of alumina by the Bayer process, including a precipitation process having an agglomeration stage and a growth stage in which the precipitation slurry is passed through a multiplicity of growth tanks. In the agglomeration stage, the precipitation slurry is maintained at a temperature of about 75° C. to 85° C. In the growth stage, the agglomeration slurry is cooled by about 1° C. to 3° C. in each growth tank of the multiplicity of growth tanks as compared to an adjacent previous growth tank. The temperature of the precipitation slurry leaving the final precipitator is preferably about 55° C.

8 Claims, 7 Drawing Sheets

PRODUCTION OF LOW SODA ALUMINA

FIELD OF THE INVENTION

This invention relates to improvements in alumina plants, and particularly plants operating according to the Bayer process to extract alumina from bauxite.

Background of the Invention

The Bayer process, and numerous improvements and modifications thereof, is widely used in the processing of bauxite to produce metal grade alumina. Most alumina plants producing metal grade alumina currently use a precipitation process which is a combination of agglomeration and growth to meet the requirements for crystal size end morphology. The precipitation process is normally carried out at the lowest possible temperature to maximize the process yield.

Modern downstream alumina users now require that the alumina be provided with a low soda content, while maintaining the desired crystal size and morphology. To achieve a lower soda content, the precipitator start temperatures are usually increased, and this results in considerable loss of yield, and thus plant efficiency.

Summary of the Invention and Object

It is the object of the present invention to provide alumina plant improvements which result in a high yield of low soda alumina. In the present specification, the term "low soda" should be understood to include soda contents of about 0.25 to 0.35 per cent $Na_2O$.

In one aspect, the invention provides a process for the production of alumina using the Bayer process including a precipitation process having an agglomeration stage and a growth stage, characterized by controlling selected process parameter(s) during the agglomeration stage to limit the bound soda content of the slurry while maintaining conditions necessary for high yield, and controlling selected operating parameter(s) during the growth stage to control the soda pick-up during the growth stage so that a continuous decrease of soda content is obtained.

The growth stage is preferably divided into a multiplicity of separate stages and the pick-up of soda is controlled by limiting the supersaturation of the liquor in each growth stage.

In one preferred form of the invention, the supersaturation of the liquor is limited by controlling the temperature of the liquor in each growth stage such that each successive downstream growth stage has a small reduction in temperature when compared to an adjacent upstream stage. It has been found that acceptable results are produced when each successive downstream growth stage is operated such that the liquor temperature is 1° to 3° C., and preferably about 2° C., cooler than the liquor temperature in the adjacent upstream stage. The temperature of each stage is preferably controlled within this profile so as to achieve in the last growth stage a temperature necessary for a high yield, for example, about 55° C.

The temperature of the liquor in each growth stage may be controlled by use of forced cooling in each growth stage. For example, heat exchange means may be associated with each growth stage to control the liquor temperature to the desired temperature.

In a particularly preferred form of the invention, the bound soda content is limited during the agglomeration stage by controlling the temperature in the agglomeration stage so that it substantially falls within the range 75° to 85° C.

To further improve the results achieved, hydrate seed is added to both stages of the precipitation process. In a preferred form, a seed slurry is added to the agglomeration precipitator, or to the first of the agglomeration precipitators where more than one is used, the slurry having a solids content of about 10 to 20 percent of particles less than about 44 microns with a $d_{50}$ of about 60 to 70 μm.

In the case of the growth stage or stages, a seed slurry is preferably added to the feed to the first growth stage, with the slurry preferably containing hydrate solids typically with about 5 to 8 percent of particles less than about 44 microns and with a $d_{50}$ of about 75 to 85 microns.

In another aspect, the invention provides an alumina plant operating according to the Bayer process including precipitation means having an agglomeration stage and a growth stage, characterized by means for controlling selected operating parameter(s) during said agglomeration stage to limit the bound soda content of the slurry while maintaining conditions necessary for a high yield, and means for controlling selected operating parameter(s) during said growth stage to control soda pick-up during the growth stage so that a continuous decrease of soda content is obtained.

In a preferred form of the invention, means are provided to control the temperature of the liquor in the agglomeration stage so that it substantially falls within the range 75° to 85° C. The apparatus is further preferably controlled so that the temperature of the liquor in the growth stage is gradually reduced in a step wise manner. For example, the growth stage is divided into a multiplicity of precipitation tanks, each of which has an associated heat exchanger which reduces the temperature of the liquor within each tank by about 1° to 3° C., and preferably about 2° C., so that an exit temperature of the order of 55° C. is achieved.

The apparatus also preferably includes means for delivering hydrate seeding particles to each of the agglomeration stage and the growth stage, preferably as feed to each stage or to the first stage of each stage if multi-stages are used.

BRIEF DESCRIPTION OF THE DRAWINGS

The invention will now be described in greater detail with reference to the accompanying drawings in which a presently preferred embodiment of the invention is shown. In the drawings.

DESCRIPTION OF PREFERRED EMBODIMENT

Figure 1:
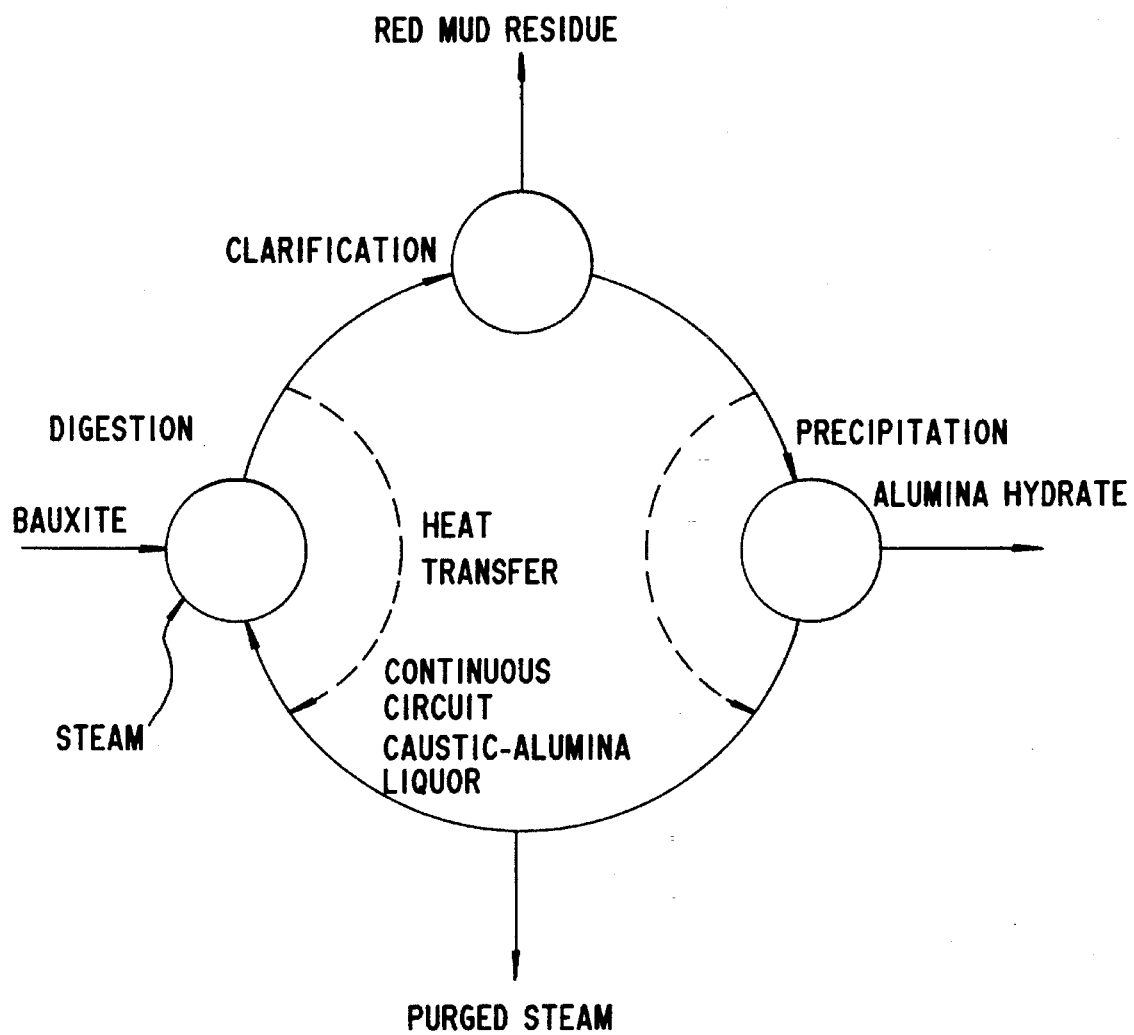
FIG. 1 is a schematic process diagram of the Bayer process showing the modified precipitation stage.

The Bayer process shown schematically in FIG. 1 of the drawings is widely used in the processing of bauxite to metal grade alumina and is therefore well understood by persons skilled in the art. No further description of the overall process is therefore required. In the preferred embodiment of the invention, the precipitation stage is modified to produce a high yield of low soda alumina hydrate which is then processed ready for calcination.

Figure 2:
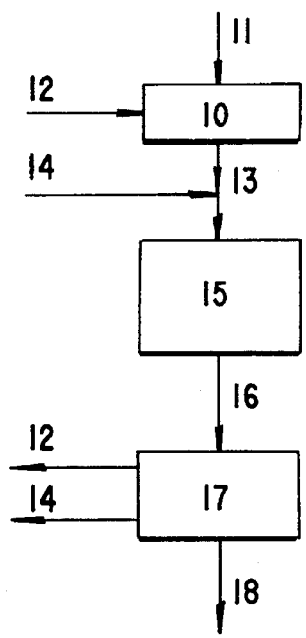
FIG. 2 is a more detailed block diagram showing the modified precipitation stages.

The preferred precipitation process is shown in greater detail in FIG. 2 of the drawings.

The precipitation area forms part of the overall white side which is designed to produce a hydrate:

Suitable for calcining in modern fluo-solids calciners with minimum breakdown of particle.

Suitable for producing an alumina with a consistent quality, as specified.

At a yield of 75 g$Al_2O_3$/l (based on pregnant liquor).

To achieve the quality required, the precipitation process is separated into two stages: an agglomeration stage followed by a growth stage. The agglomeration stage is designed to maintain a balance of fine hydrate particles in the precipitation circuit by forming agglomerates. The growth stage consolidates and coarsens the agglomerates to form the strong hydrate by growth of the hydrate particles.

In the agglomeration stage, (10) as shown in FIG. 2, hog pregnant liquor (11) is seeded with a washed tertiary seed (12). The slurry is held in a number (eg. two) of agitated precipitation vessels arranged in series to give time for agglomeration to proceed to the required level.

The resulting agglomeration slurry is then seeded in the growth stage with a more coarse secondary seed (14). The slurry then passes through a series of large agitated precipitators in the growth stage (15) and is progressively cooled to a low exit temperature. The size of the discrete cooling steps, exit temperature and tankage volume is chosen to achieve high yield and low soda content.

The slurry (16) from the last of the growth precipitators is transferred for classification by classification circuit (17) into product hydrate for calcination (18) end tertiary seed (12) and secondary seed (14) for recycle to the precipitation circuit. The overall precipitation process is advantageously arranged as shown in the process flow sheet shown as FIG. 2 in our pending Australian Provisional Patent Application No. PL 0977, filed 19 Feb. 1992, the entire contents of which are herein incorporated by reference.

The precipitation area may include two identical parallel precipitation chains, with each chain capable of 0.5 mt/y production rate.

To produce a hydrate with the required qualities of strength, chemical composition and granulometry at the specified yield, requires consideration of a number of variables of the precipitation process: liquor quality, seed charge/granulometry, temperature profile, residence time, number of precipitators.

Based on computer modelling the process has been designed:

to operate with a liquor having 225 g/l $Na_2CO_3$, 0.69 A/C and 90% C/S:

with an agglomeration section in each chain which consists of two tanks in series, to give an agglomeration time of 4–6 hours operating at a temperature in the range of about 75°–80° C., cooling the hot pregnant liquor from an inlet temperature of about 103° C.;

with a growth section in each chain which consists of about 10 tanks in series, to give an average time of 40–45 hrs based on final slurry volume;

with temperature of the growth chain being reduced by small step cooling about 1° to 3° C., and preferably about 2° C., in each tank, to reach approximately 55° C. in the last precipitator; and with seed charges to achieve up to 200 g/l solids, preferably about 175 g/l in the agglomeration slurry and up to 450 g/l solids in the slurry from the last growth precipitator, preferably about 375 g/l.

Seed charges may be as low as about 100 g/l in the agglomeration slurry and about 280 g/l in the growth slurry. In any event, the seeding is contained at a level which will achieve the alumina quality substantially as disclosed in Table 1.

The apparatus and process has potential for operating at a higher yield of 85–90 g$Al_2O_3$/l while maintaining the quality of hydrate. This is achieved by increasing the caustic concentration to about 240–250 g/l $Na_2CO_3$ and A/C ratio of the fill liquor to about 0.71 to 0.73, and installation of an additional two precipitators on each chain, and/or producing hydrate which will produce an alumina with a soda content of 0.22–0.27%, which is lower than presently desired. This will be achieved by manipulating the supersaturation levels in the precipitation tanks by changing the cooling profile and/or the addition point of the pregnant liquor.

The design is required to give a process which is controllable and reasonably simple to operate. Flexibility of the process is also a requirement, such that with minimum impact on product quality, the process is capable of absorbing changes which may occur as a result of variations from outside and/or inside the precipitation area e.g. plant flow rate, liquor quality change, fining excursion, etc.

It is also necessary that the operational aspects be considered. Precipitators are to be capable of being bypassed, emptied, cleaned and returned to service, without causing major disturbance to the process control and production of quality hydrate.

The agglomeration section of each precipitation chain operates independently but typically with similar process conditions. Fifty percent of the pregnant liquor (at target temperature of about 78° C.) and 50% of tertiary seed reslurry (from the tertiary seed slurry tank) is added to the first agglomeration precipitator in each chain. The tertiary seed slurry will contain solids with typically 10–20% of particles less than 44 microns and with a $d_{50}$ of 60–70 microns.

The agglomeration precipitators are typically of 2200 m$^3$ (average) volume, flat bottom, open top, straight sided vessels fitted with draft tube agitators to a standard design used in the alumina industry. The tanks are of constant diameter, but height will be varied to provide gravity overflow from first to last. As the agglomeration section is located at the front of the precipitation process, the precipitator height must be sufficient to allow gravity overflow to the growth precipitators.

The precipitators are connected by a launder system which allows for flows to be maintained, when one or more adjacent precipitators is based. Each agglomeration precipitator overflows to the transfer launder via an internal riser which allows sufficient depth below the riser to avoid bogging the riser pipe with settled hydrate when agitation is stopped. The launder system is fitted with a gate system which allows a precipitator to be readily bypassed and also allows safe isolation of the precipitator when bypassed. The agglomeration precipitators are not force-cooled but are allowed to operate at temperature consistent with normal radiation and convection heat losses to achieve the target temperature.

The slurry from the agglomeration precipitators containing hydrate solids typically with 10–15% of particles less than 44 microns is transferred via overflow launders to the first of the growth precipitators. A portion of the agglomeration slurry from each chain overflows to the Secondary Seed Reslurry Tanks for reslurry of secondary seed, to give a pumpable slurry of 800–850 g/l solids.

The growth section in each precipitation chain will be designed to provide up to 45 hours of nominal residence time for the slurry in the growth precipitators. The growth section in each chain will consist of about 11 precipitators arranged for series operation; normally 10 on line with one bypassed for cleaning/maintenance. Each growth precipitator has an associated cooling heat exchanger, such as an in-tank cooler of the type described in our corresponding Provisional Patent Application PK 4123 dated 7 Jan. 1991, which operates to cool each stage by about 1° to 3° C., preferably about 2° C.

The major portion of the agglomeration slurry which overflows the last agglomeration precipitator on each chain flows directly to the first growth precipitator in each chain.

The secondary seed (reslurried in the Secondary Seed Reslurry Tanks with product wash filtrate and a fraction of the agglomeration slurry), is proportioned to each growth chain, normally 50% to each. The seed slurry is added to the launder after the last agglomeration precipitator and before the first growth precipitator. Secondary seed will contain hydrate solids typically with 5–8% of particles less than 44 microns.

The slurry from the first growth precipitator flows by gravity to the next on line growth precipitator and successively through the ten stages in series via an external launder system. As the slurry proceeds through the growth precipitators the agglomerates are strengthened by growth. Typically the slurry from the last of the growth precipitators contains hydrate with 4–8% less than 44 microns with $d_{50}$ of 75–85 microns.

Each precipitator overflows via an internal riser pipe which allows sufficient depth below the riser for settled hydrate, to avoid bogging during periods of lost agitation. The launder system connecting The precipitators is arranged such that flows are maintained when one or more adjacent precipitators are bypassed.

The growth precipitators are built to a standard design used in the alumina industry and are about 4400 m³ average volume, flat bottom, open top, straight sided vessels fitted with draft tube agitators. The tanks typically have a 2/1 height/diameter ratio to avoid excessive heights. The precipitators are arranged in an arrangement which best meets the requirements for continuous operation, gravity flow and bypassing.

The slurry from the last on-line growth precipitator of each chain is pumped from a bottom suction on the precipitator to the Classification area. The level in the last precipitator is controlled by variable speed pump to maintain a submerged agitator and full agitation of the precipitator. No riser is installed in the last precipitator. An emergency shut off valve is installed (if required) to avoid drain down on shutdown.

A single pump will be installed in each precipitation chain and a third pump is installed which as a common spare for the two chains. The pump suction is piped and valved to each of the last two precipitators in the same chain, to allow bypassing of the last precipitator.

Figure 3A:
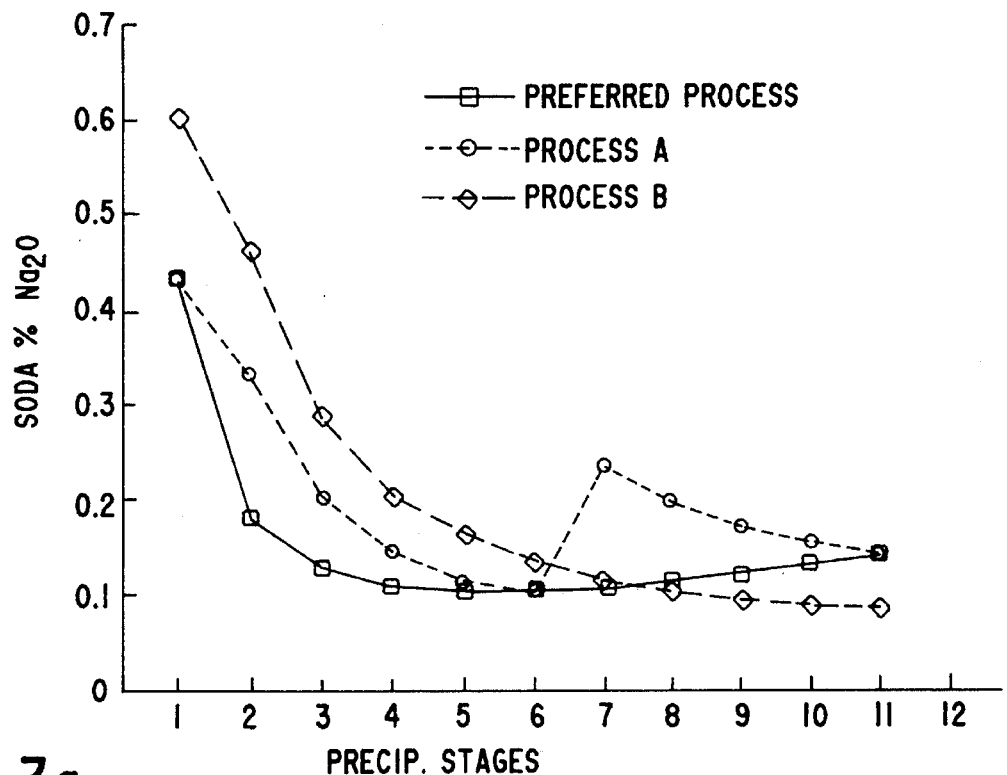
FIG. 3a and 3b show graphs illustrating the improvements in soda pick-up and cumulative soda achieved by increasing the growth precipitation stages.
Figure 3B:
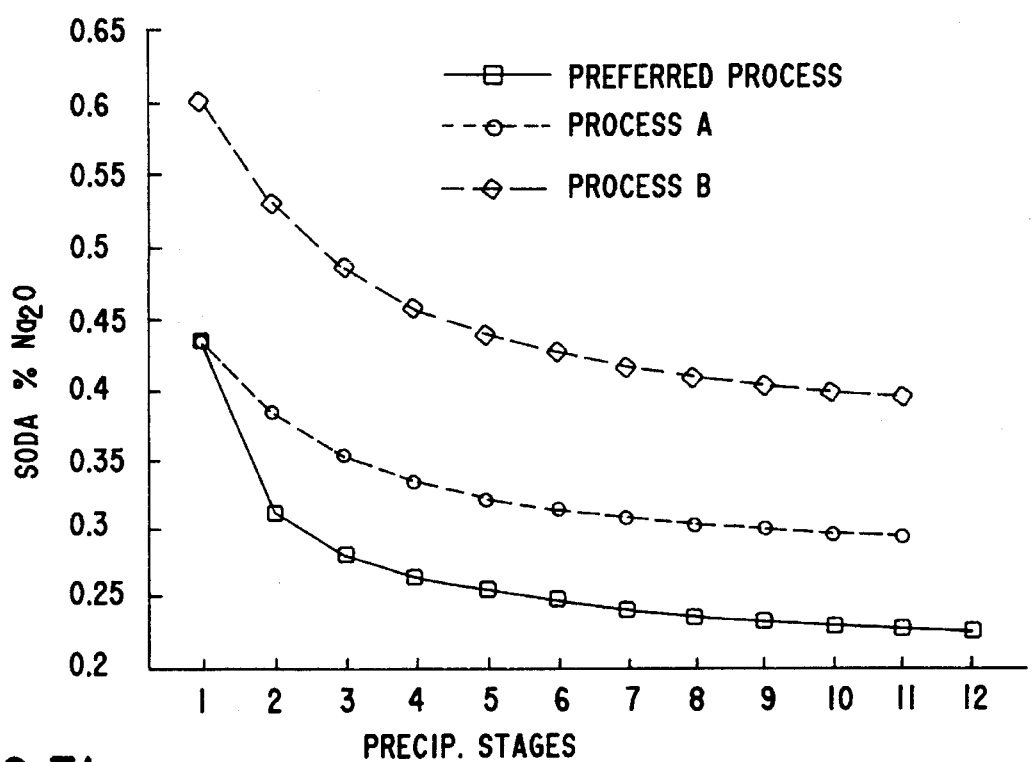

Graphs A and B of FIG. 3 demonstrate the reduced soda pick-up (Graph A) and the reduced cumulative soda (Graph B) achieved as the number of growth precipitation stages increases.

Figure 4:
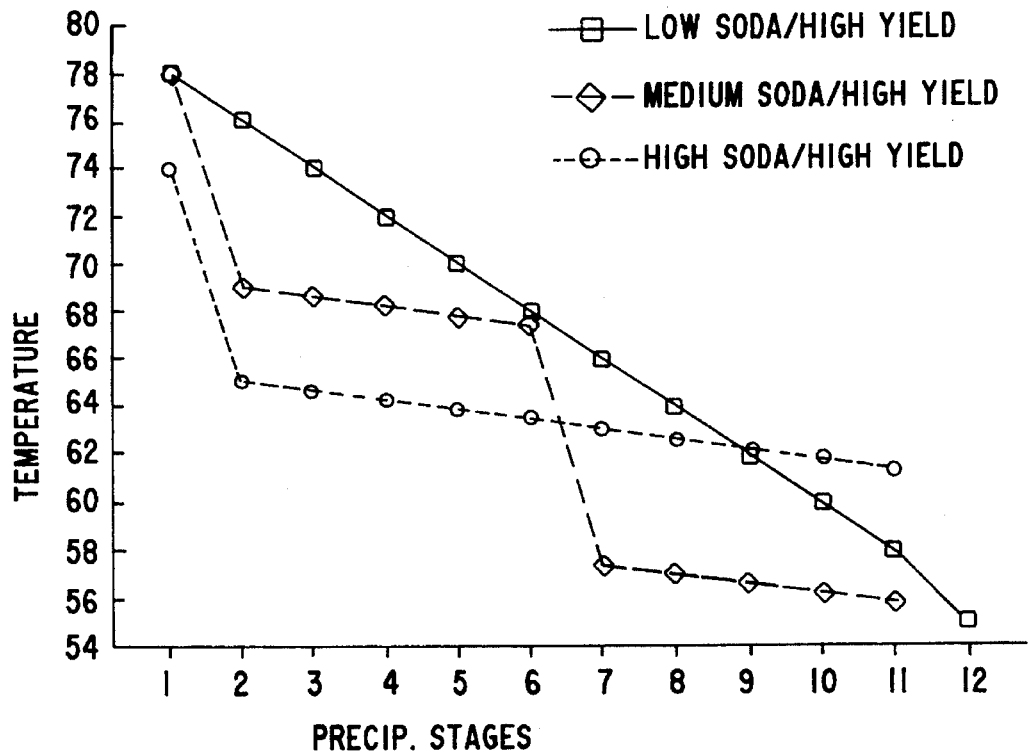
FIG. 4 is a graph showing the step wise reduction in temperature achieved in the growth precipitation stages.

Graph C of FIG. 4 shows the stepwise drop in temperature in the growth precipitation stages.

Figure 5:
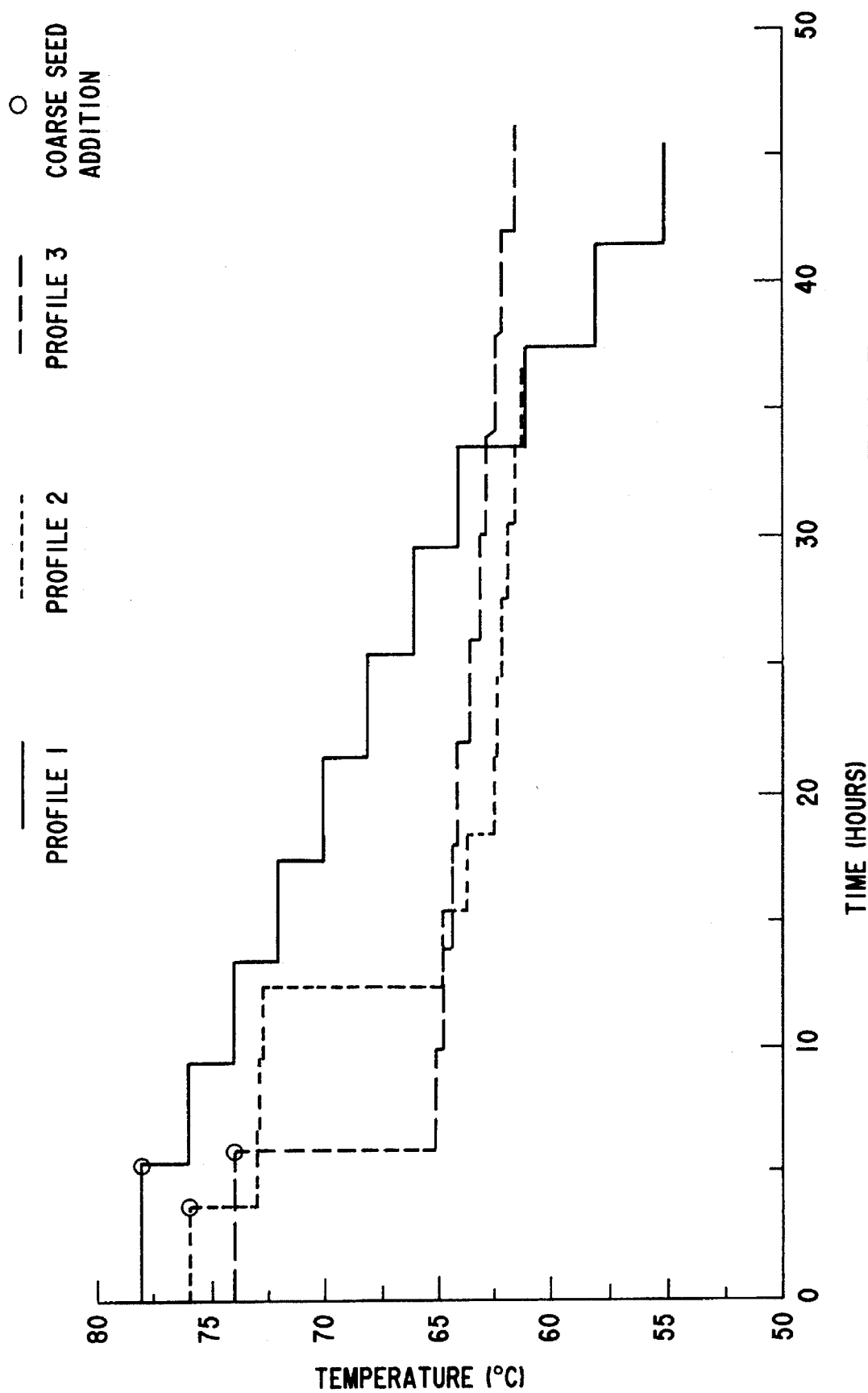
FIG. 5 shows a representation of the temperature profiles used to exemplify the present invention.

In order to demonstrate the advantages of the present invention, a series of experimental runs were carried out to investigate soda impurity levels and hydrate yield for a range of precipitation temperature profiles and organic carbon levels. The trials were conducted as individual bottle tests in a rotating water bath. Three different temperature profiles were used. Profile 1 is a temperature profile that falls within the scope of the present invention. Profiles 2 and 3 are indicative of temperature profiles currently used in alumina production. The temperature profiles used in the experimental work are shown in FIG. 5.

The experiments were carried out at low and high concentrations of organics in the liquor. The liquor used in the experimental runs had an initial caustic soda concentration in the range of 218 to 230 g/l, calculated as $Na_2CO_3$. The alumina content of the liquor was around 155 g/l. Initial A/C ratios were in the range of from 0.66 to 0.71, with C/S ratio ranging from 0.79 to 0.92.

The liquor and solids content of each bottle was sampled and analysed for alumina and caustic concentrations, solids mass, particle size distribution and soda content.

Figure 6:
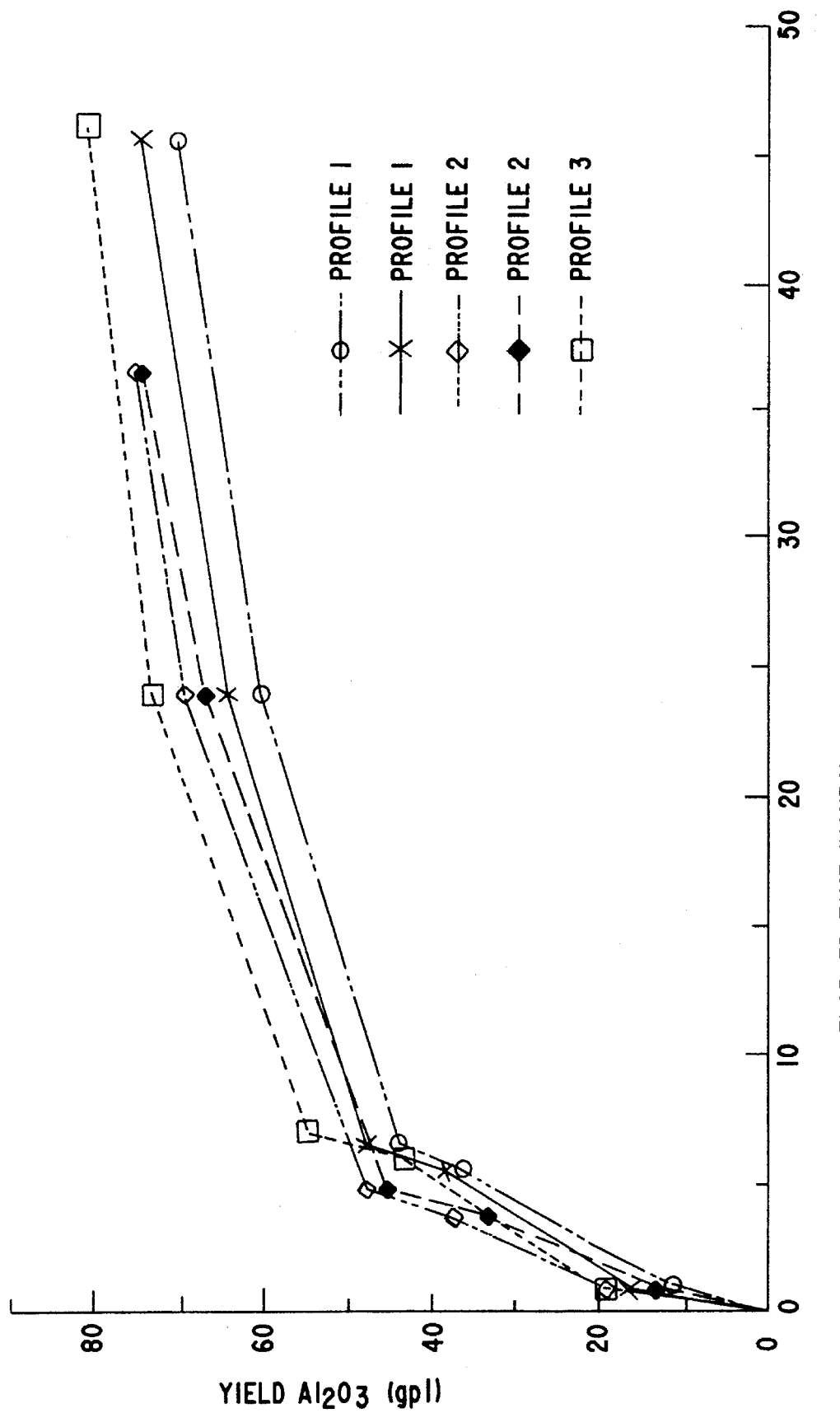
FIG. 6 shows the yield of alumina obtained from bottle tests using the temperature profiles of FIG. 5. The alumina yields shown in FIG. 6 have been calculated from liquor analysis.
Figure 7:
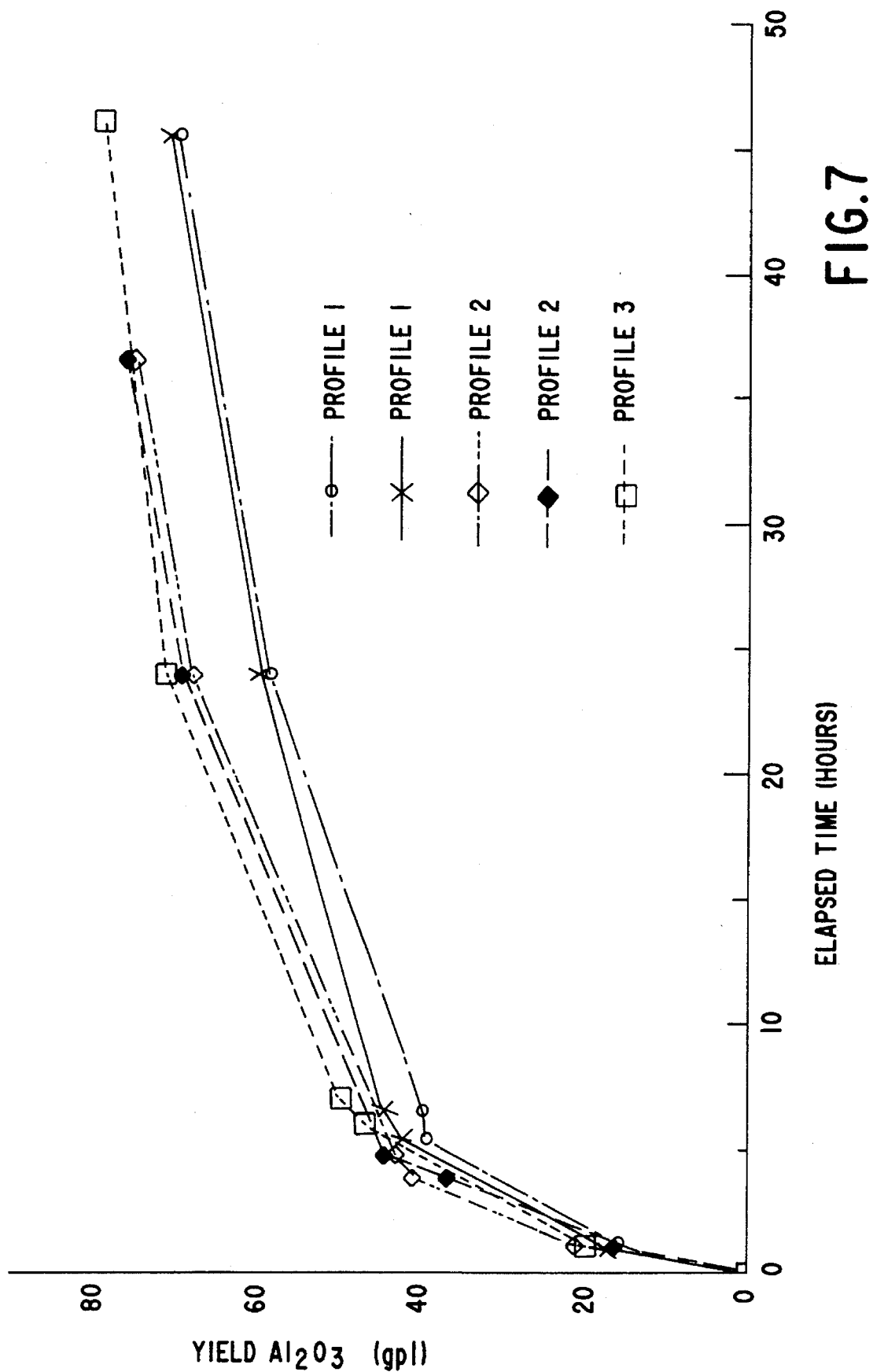
FIG. 7 shows the yield of alumina (as calculated from solids analysis) obtained from bottle tests using the temperature profiles of FIG. 5.

The yield of alumina obtained from the experimental runs is shown in FIGS. 6 and 7. FIG. 6 shows the alumina yield as calculated from an analysis of the liquor, whilst FIG. 7 shows the alumina yield calculated from the solids recovered from the tests.

As Can be seen from FIGS. 6 and 7, there is no significant difference between the yield obtained from profile 1 (the profile that falls within the scope of the present invention) and the yields obtained from profiles 2 and 3.

Figure 8:
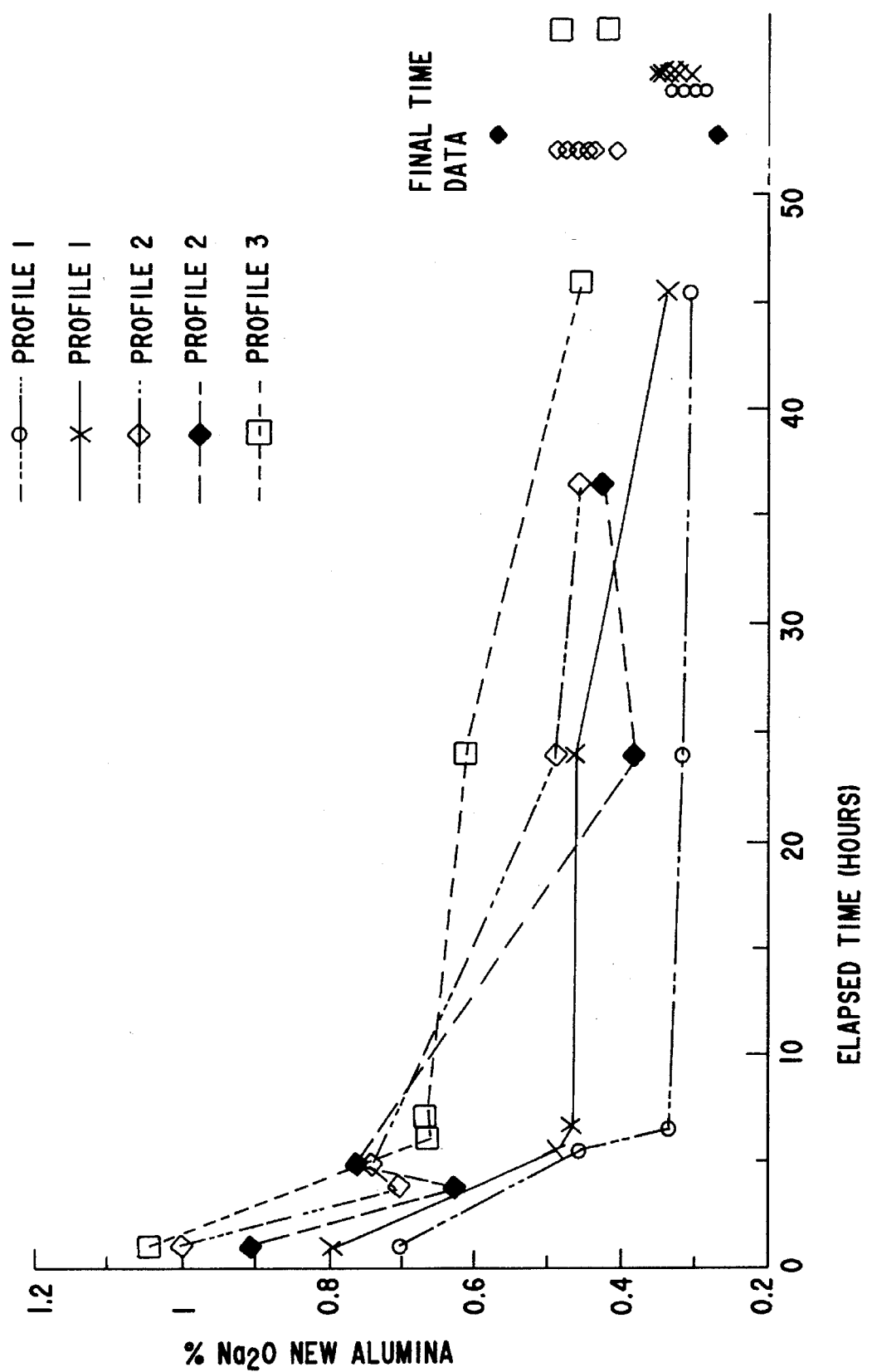
FIG. 8 shows the soda pick-up in the precipitated alumina obtained from bottle tests using the temperature profiles of FIG. 5.

FIG. 8 shows the change in soda content of the precipitated alumina with time for each run. The soda content only represents the soda contained in the layer of newly precipitated alumina, not the existing soda in the fine and coarse seed. The results shown in FIG. 8 clearly demonstrate that the profile that falls within the scope of the present invention (profile 1) produces hydrate with significantly lower soda content than profiles 2 and 3, which represent profiles currently used in the industry.

The soda levels recorded in the experiments are generally higher than those found in a refinery. This is due to the bottle experiments having a continuous change in the A/C ratio. However, in a refinery, the A/C ratio changes in a stepwise fashion as slurry from one tank overflows into the next tank. This is most important in the first tank of the precipitation train where pregnant liquor enters at, say 0.69 A/C and immediately drops to, say, 0.62 as it mixes with the slurry contained in the first tank and so reduces the supersaturation. Although the soda level obtained in a refinery for all three profiles tested in the experimental runs will be lower than the results shown in FIG. 8, the relativity between the profiles will still be present, with profile 1 exhibiting lower soda pick-up than profile 2 or profile 3.

The results shown in FIGS. 6, 7 and 8 show that the method of the Present invention is capable of producing low soda alumina by the Bayer process whilst still maintaining a high yield.

TABLE 1

| | ALUMINA QUALITY | |
|---|---|---|
| | TYPICAL | SHIPMENT |
| $Fe_2O_3/SiO_2$ % | 0.012 | 0.015 max |
| $Na_2O$ % | 0.30 | 0.35 max |
| CaO % | 0.020 | |
| $TiO_2/V_2O_5$ % | 0.005 | |
| $P_2O_5$ % | 0.001 | |
| Gibbsite % | 0.10 | 0.20 max |
| Alpha $Al_2O_3$ % | 3 | |
| −45 microns % | 8 | 12 max |
| +150 microns % | 1 | 5 max |
| S.S.A. $m^2/g$ | 70 | 60–80 |
| LOM (300–1100° C.) % | 0.9 | 1.2 max |
| −20 Microns % | 1.0 | 2.0 max |
| Attrition Index % | 15 | 25 max |
| Bulk Density $t/m^3$ | 1.2 | |

Notes:
No ESP dust in product
Quality consistency imperative
Capability of achieving 0.25% $Na_2O$

We claim:

1. A process for producing alumina hydrate according to the Bayer process, wherein ground bauxite is treated with an aqueous caustic medium at an elevated temperature to produce a pregnant liquor comprising a solution of sodium aluminate, and alumina hydrate is thereafter precipitated from the pregnant liquor in the presence of seed particles in a precipitation process, wherein the precipitation process comprises an agglomeration stage in which a first seed slurry is added to the pregnant liquor to form a precipitation slurry and a growth stage in which the precipitation slurry is passed through a multiplicity of growth tanks comprising a first growth tank and a last growth tank, the process comprising:

maintaining the precipitation slurry at a temperature of about 75° C. to 85° C. in the agglomeration stage, passing the precipitation slurry from the agglomeration stage to the first growth tank of the multiplicity of growth tanks of the growth stage, and thereafter cooling the precipitation slurry by about 1° C. to 3° C. in each growth tank of the multiplicity of growth tanks as compared to an adjacent upstream growth tank.

2. The process as claimed in claim 1, wherein the precipitation slurry is cooled by about 2° C. in each growth tank of the multiplicity of growth tanks as compared to an adjacent upstream growth tank.

3. The process as claimed in claim 1, wherein the precipitation slurry leaves the last growth tank of the multiplicity of growth tanks at a temperature of about 55° C.

4. The process as claimed in claim 1, wherein the first seed slurry contains solid particles, about 10 to 20% of said solid particles having a particle size of less than 44 micrometers and a $d_{50}$ of about 60 to 70 micrometers.

5. The process as claimed in claim 1, further comprising adding a second seed slurry to the growth stage, said second seed slurry containing solid particles, about 5 to 8% of said solid particles having a particle size of less than 44 micrometers and a $d_{50}$ of about 75 to 85 micrometers.

6. The process as claimed in claim 1, wherein the precipitation slurry is cooled in each growth tank of the multiplicity of growth tanks by forced cooling of the precipitation slurry.

7. The process as claimed in claim 1, wherein the pregnant liquor has a caustic concentration of 225 g/l, calculated as $Na_2CO_3$, an alumina to caustic (A/C) ratio of 0.69 and a caustic to soda (C/S) ratio of 90%.

8. The process as claimed in claim 1, wherein the pregnant liquor has a caustic concentration of about 240–250 g/l, calculated as $Na_2CO_3$ and an alumina to caustic (A/C) ratio of about 0.71 to 0.73 and the process produces a yield of product alumina hydrate of about 85 to 90 g/l, calculated as $Al_2O_3$.

* * * * *

UNITED STATES PATENT AND TRADEMARK OFFICE
CERTIFICATE OF CORRECTION

PATENT NO. : 5,529,761

DATED : June 25, 1996

INVENTOR(S) : Brown et al.

It is certified that error appears in the above-identified patent and that said Letters Patent is hereby corrected as shown below:

Title page, Item [73], line 1, delete "Comalco Aluminum Limited"

insert therefor -- Comalco Aluminium Limited --.

Signed and Sealed this

Twenty-sixth Day of November 1996

Attest:

BRUCE LEHMAN

Attesting Officer       Commissioner of Patents and Trademarks